(12) United States Patent
Ashida et al.

(10) Patent No.: US 12,401,108 B2
(45) Date of Patent: Aug. 26, 2025

(54) FILTER CIRCUIT

(71) Applicant: TDK CORPORATION, Tokyo (JP)

(72) Inventors: Yuta Ashida, Tokyo (JP); Masahiro Tatematsu, Tokyo (JP); Shuhei Sawaguchi, Tokyo (JP); Keigo Shibuya, Tokyo (JP); Tetsuzo Goto, Tokyo (JP)

(73) Assignee: TDK CORPORATION, Tokyo (JP)

( * ) Notice: Subject to any disclaimer, the term of this patent is extended or adjusted under 35 U.S.C. 154(b) by 304 days.

(21) Appl. No.: 18/175,098

(22) Filed: Feb. 27, 2023

(65) Prior Publication Data

US 2023/0282954 A1    Sep. 7, 2023

(30) Foreign Application Priority Data

Mar. 4, 2022  (JP) .................................. 2022-033471

(51) Int. Cl.
*H01P 1/20*  (2006.01)
*H01P 1/207*  (2006.01)
*H01P 7/06*  (2006.01)

(52) U.S. Cl.
CPC ................ *H01P 1/207* (2013.01); *H01P 1/20* (2013.01); *H01P 7/06* (2013.01)

(58) Field of Classification Search
CPC ........ H01P 1/20; H01P 1/203; H01P 1/20327; H01P 1/20336; H01P 1/20345

USPC .................................. 333/175, 185, 204, 205
See application file for complete search history.

(56) References Cited

U.S. PATENT DOCUMENTS 5,191,305 A * 3/1993 Frost ..................... H01P 1/2136
333/202
2020/0303798 A1    9/2020 Ashida et al.

FOREIGN PATENT DOCUMENTS

KR        10-1583015 B       1/2016

OTHER PUBLICATIONS

Translation of Apr. 30, 2025 Office Action issued in Japanese Application No. 2022-033471.

* cited by examiner

*Primary Examiner* — Stephen E. Jones
(74) *Attorney, Agent, or Firm* — Oliff PLC

(57) ABSTRACT

A filter circuit includes two ports, a first resonant circuit, and a second resonant circuit. The first resonant circuit is provided between the two ports in a circuit configuration and coupled with both of the two ports. The second resonant circuit is provided between the two ports in the circuit configuration and coupled with at least one of the two ports. Coupling of the second resonant circuit and the two ports is weaker than coupling of the first resonant circuit and the two ports.

8 Claims, 17 Drawing Sheets

FILTER CIRCUIT

CROSS REFERENCE TO RELATED APPLICATIONS

This application claims the benefit of Japanese Priority Patent Application No. 2022-033471 filed on Mar. 4, 2022, the entire contents of which are incorporated herein by reference.

BACKGROUND OF THE INVENTION

1. Field of the Invention

The present invention relates to a filter circuit including two resonant circuits.

2. Description of the Related Art

One of electronic components used in communication apparatuses is a band-pass filter. Such a band-pass filter is desired to reduce insertion loss in the passband thereof and increase insertion loss outside the passband.

US 2020/0303798 A1 describes a filter device configured by combining a band-pass filter and a band elimination filter (band stop filter). This filter device uses the band elimination filter to increase insertion loss in a frequency region higher than the passband thereof.

Communication services using fifth-generation mobile communication systems (hereinafter referred to as 5G) are currently started to be provided. For 5G, the use of frequency bands of 10 GHz or higher, particularly a quasi-millimeter wave band of 10 to 30 GHz and a millimeter wave band of 30 to 300 GHz, is assumed. In these frequency bands, as the frequency bands used for fourth-generation or earlier mobile communication systems, a plurality of standards dealing with relatively close frequency bands are present. Hence, it is also desired, in a band-pass filter used in 5G, that insertion loss abruptly changes in a frequency region close to the passband of the band-pass filter.

In a band-pass filter of a known art, the number of resonators constituting the band-pass filter is increased in order to obtain characteristics of abrupt change of insertion loss in a frequency region close to the passband of the band-pass filter. However, there occurs a problem that the insertion loss of the passband increases as the number of resonators increases when comparison is made with the resonators having the same Q value.

Now, consider that a band-pass filter uses a band elimination filter to obtain characteristics of abrupt change of insertion loss in a frequency region close to the passband of the band-pass filter. In this case, the center frequency of the stop band of the band elimination filter need be set to a frequency close to the passband. However, there occurs a problem that the insertion loss of the passband of the band-pass filter increases.

The above-described problems apply not only to a filter circuit including a band-pass filter and a band elimination filter but also to filter circuits in general each using a slave resonant circuit in order to adjust characteristics of a master resonant circuit.

SUMMARY OF THE INVENTION

An object of the present invention is to provide a filter circuit that includes a master resonant circuit and a slave resonant circuit and can obtain desired characteristics while suppressing deterioration of characteristics of the filter circuit obtained by the master resonant circuit.

A filter circuit of the present invention includes: two ports; a first resonant circuit including a plurality of first resonators, provided between the two ports in a circuit configuration, and coupled with both of the two ports; and a second resonant circuit including a plurality of second resonators, provided between the two ports in the circuit configuration, and coupled with at least one of the two ports. Coupling of the second resonant circuit and the two ports is weaker than coupling of the first resonant circuit and the two ports.

The filter circuit of the present invention may further include: two first capacitors capacitive-coupling the first resonant circuit and the two ports; and at least one second capacitor capacitive-coupling the second resonant circuit and the two ports. Capacitance of the at least one second capacitor may be smaller than capacitance of each of the two first capacitors. Alternatively, the filter circuit of the present invention may further include at least one second capacitor capacitive-coupling the second resonant circuit and the two ports, and the first resonant circuit may be directly coupled with at least one of the two ports.

In the filter circuit of the present invention, the plurality of second resonators may include a first particular resonator and a second particular resonator. The first particular resonator may be coupled with one of the two ports. The second particular resonator may be coupled with the other of the two ports. The first particular resonator and the second particular resonator may be coupled with each other.

In the filter circuit of the present invention, each of the plurality of second resonators may be a resonator with open ends.

In the filter circuit of the present invention, the first resonant circuit may configure a band-pass filter.

In the filter circuit of the present invention, the second resonant circuit may configure a band elimination filter.

In the filter circuit of the present invention, coupling of the second resonant circuit and the two ports may be weaker than coupling of the first resonant circuit and the two ports. With these configurations, according to the present invention, it is possible to provide a filter circuit that can obtain desired characteristics while suppressing deterioration of characteristics of the filter circuit obtained by a first resonant circuit.

Other and further objects, features, and advantages of the present invention will appear more fully from the following description.

DETAILED DESCRIPTION OF THE PREFERRED EMBODIMENTS

First Embodiment

Figure 1:
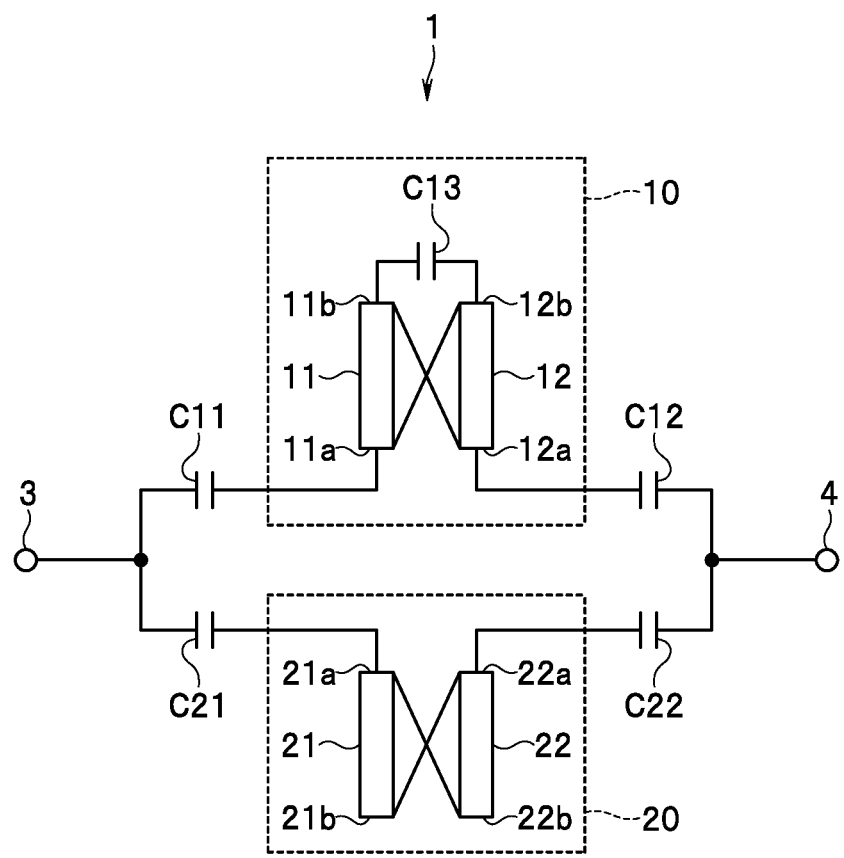
FIG. 1 is a circuit diagram illustrating a circuit configuration of a filter circuit according to a first embodiment of the present invention.

Preferred embodiments of the present invention will now be described in detail with reference to the drawings. First, reference is made to FIG. 1 to describe an overview of a configuration of a filter circuit 1 according to a first embodiment of the present invention. The filter circuit 1 includes two ports 3 and 4, a first resonant circuit 10, and a second resonant circuit 20. Each of the ports 3 and 4 is a port for input or output of a signal.

In the present embodiment, the first resonant circuit 10 configures a band-pass filter, and the second resonant circuit 20 configures a band elimination filter. In the present embodiment, in particular, the first resonant circuit 10 is a master resonant circuit, and the second resonant circuit 20 is a slave resonant circuit. The filter circuit 1 as a whole functions as a band-pass filter.

The first resonant circuit 10 is provided between the two ports 3 and 4 in a circuit configuration. The first resonant circuit 10 is coupled with both of the two ports 3 and 4. Note that, as used herein, the phrase "in a circuit configuration" is to describe layout in a circuit diagram, not in a physical configuration.

The second resonant circuit 20 is provided between the two ports 3 and 4 in the circuit configuration. The second resonant circuit 20 is coupled with at least one of the two ports 3 and 4. In the present embodiment, in particular, the second resonant circuit 20 is coupled with both of the two ports 3 and 4. Note that, in the present embodiment, the second resonant circuit 20 is provided in parallel with the first resonant circuit 10 between the two ports 3 and 4 in the circuit configuration and is not provided between the first resonant circuit 10 and the port 3 or the port 4.

The filter circuit 1 further includes two first capacitors C11 and C12 capacitive-coupling the first resonant circuit 10 and the two ports 3 and 4, respectively. The first capacitor C11 capacitive-couples the first resonant circuit 10 and the port 3. The first capacitor C12 capacitive-couples the first resonant circuit 10 and the port 4.

The filter circuit 1 further includes at least one second capacitor capacitive-coupling the second resonant circuit 20 and any or both of the two ports 3 and 4. In the present embodiment, in particular, the filter circuit 1 includes two second capacitors C21 and C22 as the at least one second capacitor. The second capacitor C21 capacitive-couples the second resonant circuit 20 and the port 3. The second capacitor C22 capacitive-couples the second resonant circuit 20 and the port 4.

Coupling of the second resonant circuit 20 and the two ports 3 and 4 is weaker than coupling of the first resonant circuit 10 and the two ports 3 and 4. When coupling between a resonant circuit and a port is capacitive coupling as in the present embodiment, the coupling becomes stronger as the capacitance of the capacitor capacitive-coupling the resonant circuit and the port increases. In other words, the coupling between the resonant circuit and the port becomes weaker as the capacitance decreases.

In the present embodiment, the capacitance of each of the second capacitors C21 and C22 is smaller than the capacitance of each of the first capacitors C11 and C12. Consequently, each of the coupling between the second resonant circuit 20 and the port 3 and the coupling between the second resonant circuit 20 and the port 4 is weaker than each of the coupling between the first resonant circuit 10 and the port 3 and the coupling between the first resonant circuit 10 and the port 4. In an example, the capacitance of each of the second capacitors C21 and C22 is 0.03 pF, and the capacitance of each of the first capacitors C11 and C12 is 0.14 pF.

Reference is now made to FIG. 1 to describe an example of a configuration of each of the first and the second resonant circuits 10 and 20. First, the first resonant circuit 10 will be described. The first resonant circuit 10 includes a plurality of first resonators. In the present embodiment, in particular, the first resonant circuit 10 includes, as a plurality of first resonators, two first resonators 11 and 12 arranged in this order from the port-3 side in the circuit configuration. Each of the first resonators 11 and 12 is a half-wave resonator with open ends. The first resonators 11 and 12 are magnetically coupled with each other.

The first resonator 11 is coupled with the port 3. The first resonator 11 has a first end 11a being closest to the port 3 and a second end 11b being furthest from the port 3. The first capacitor C11 is provided between the first end 11a of the first resonator 11 and the port 3 in the circuit configuration.

The first resonator 12 is coupled with the port 4. The first resonator 12 has a first end 12a being closest to the port 4 and a second end 12b being furthest from the port 4. The first capacitor C12 is provided between the first end 12a of the first resonator 12 and the port 4 in the circuit configuration.

The first resonant circuit 10 further includes a capacitor C13 connecting the second end 11b of the first resonator 11 and the second end 12b of the first resonator 12. The first resonator 11 and the first resonator 12 are magnetically coupled and also capacitive-coupled via the capacitor C13, with each other.

Next, the second resonant circuit 20 will be described. The second resonant circuit 20 includes a plurality of second resonators. In the present embodiment, in particular, the second resonant circuit 20 includes, as a plurality of second resonators, two second resonators 21 and 22 arranged in this order from the port-3 side in the circuit configuration. Each of the second resonators 21 and 22 is a half-wave resonator with open ends. The second resonators 21 and 22 are magnetically coupled with each other. The second resonators 21 and 22 respectively corresponds to a "first particular resonator" and a "second particular resonator" in the present invention.

The second resonator 21 is coupled with the port 3. The second resonator 21 has a first end 21a being closest to the port 3 and a second end 21b being furthest from the port 3. The second capacitor C21 is provided between the first end 21a of the second resonator 21 and the port 3 in the circuit configuration.

The second resonator 22 is coupled with the port 4. The second resonator 22 has a first end 22a being closest to the port 4 and a second end 22b being furthest from the port 4. The second capacitor C22 is provided between the first end 22a of the second resonator 22 and the port 4 in the circuit configuration.

Figure 2:
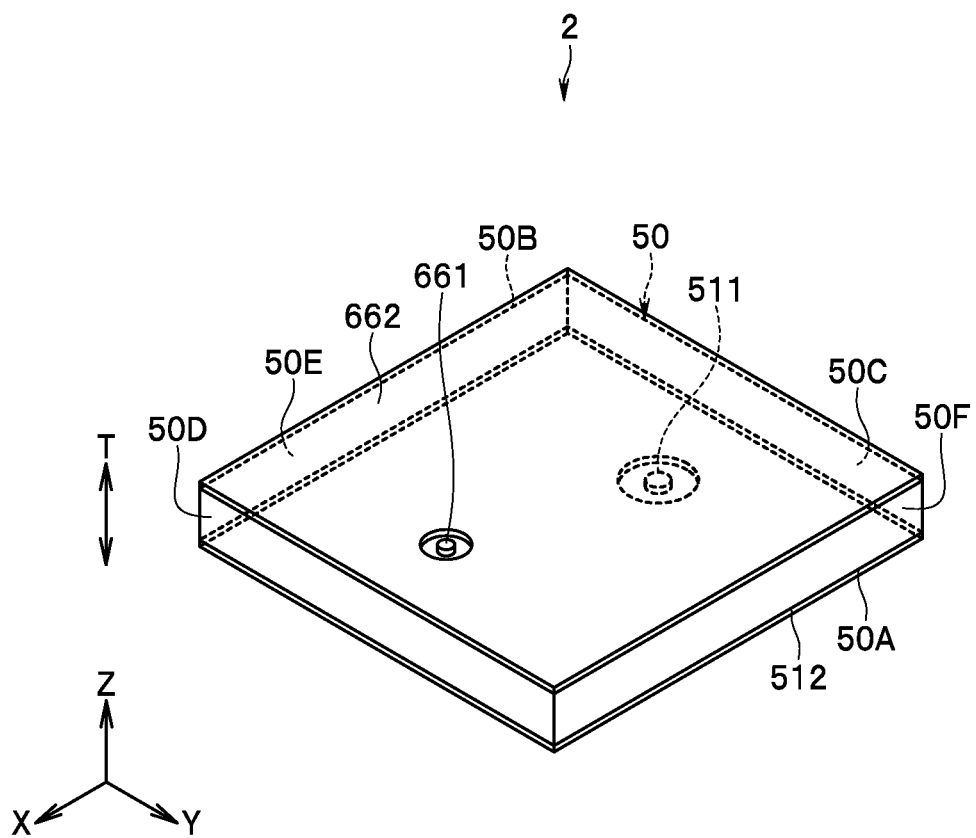
FIG. 2 is a perspective view illustrating an external view of a multilayered filter device including the filter circuit according to the first embodiment of the present invention.

Next, a configuration of a multilayered filter device (referred to simply as a filter device below) 2 in the present embodiment will be described. FIG. 2 is a perspective view illustrating an external view of the filter device 2. The filter device 2 is a filter device including the filter circuit 1 illustrated in FIG. 1.

The filter device 2 includes the components of the filter circuit 1 described with reference to FIG. 1 and a stack 50 for integrating the components of the filter circuit 1. The stack 50 includes a plurality of dielectric layers stacked together and a plurality of conductor layers and a plurality of through holes formed in the plurality of dielectric layers.

The stack 50 has a bottom surface 50A and a top surface 50B located at opposite ends of the plurality of dielectric layers in a stacking direction T, and four side surfaces 50C to 50F connecting the bottom surface 50A and the top surface 50B. The side surfaces 50C and 50D face opposite to each other, and also the side surfaces 50E and 50F face opposite to each other. The side surfaces 50C to 50F are perpendicular to the top surface 50B and the bottom surface 50A.

Here, X, Y, and Z directions are defined as illustrated in FIG. 2. The X, Y, and Z directions are orthogonal to one another. In the present embodiment, the Z direction is a direction parallel to the stacking direction T. The direction opposite to the X direction is −X direction, the direction opposite to the Y direction is −Y direction, and the direction opposite to the Z direction is −Z direction.

As illustrated in FIG. 2, the bottom surface 50A is located at a −Z-direction end of the stack 50. The top surface 50B is located at a Z-direction end of the stack 50. The side surface 50C is located at a −X-direction end of the stack 50. The side surface 50D is located at an X-direction end of the stack 50. The side surface 50E is located at a −Y-direction end of the stack 50. The side surface 50F is located at a Y-direction end of the stack 50.

The filter device 2 further includes terminals 511 and 661 and ground conductor layers 512 and 662. The terminal 511 and the ground conductor layer 512 are arranged at the bottom surface 50A. In the present embodiment, in particular, the ground conductor layer 512 covers the bottom surface 50A almost entirely. A gap is formed between the terminal 511 and the ground conductor layer 512.

The terminal 661 and the ground conductor layer 662 are arranged at the top surface 50B. In the present embodiment, in particular, the ground conductor layer 662 covers the top surface 50B almost entirely. A gap is formed between the terminal 661 and the ground conductor layer 662.

The terminal 511 corresponds to the port 3, and the terminal 661 corresponds to the port 4. The ground conductor layers 512 and 662 are each connected to the ground.

Reference is now made to FIG. 3 to FIG. 9 to describe an example of the plurality of dielectric layers and the plurality of conductor layers constituting the stack 50. In this example, the stack 50 includes sixteen dielectric layers stacked together. The sixteen dielectric layers will be referred to below as the first to sixteenth dielectric layers in the order from bottom to top. The first to sixteenth dielectric layers are denoted by reference numerals 51 to 66, respectively. In FIG. 3 to FIG. 9, each circle represents a through hole.

Figure 3:
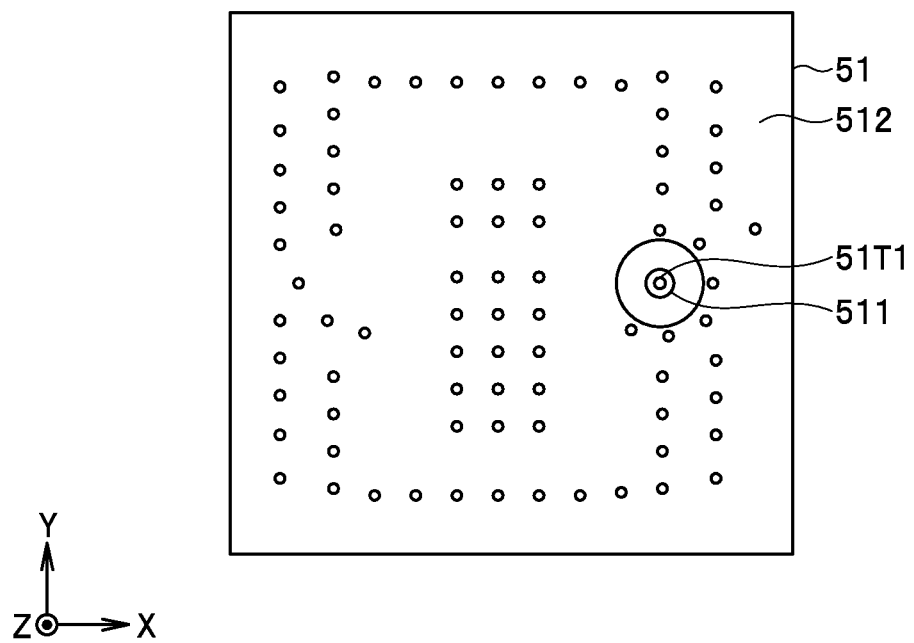
FIG. 3 is an explanatory diagram illustrating a patterned surface of a first dielectric layer in a stack of the multilayered filter device in the first embodiment of the present invention.

FIG. 3 illustrates a patterned surface of the first dielectric layer 51. The terminal 511 and the ground conductor layer 512 are formed on the patterned surface of the dielectric layer 51. A particular through hole 51T1 connected to the terminal 511 is formed in the dielectric layer 51. A plurality of through holes formed in the dielectric layer 51 excluding the particular through hole 51T1 are connected to the ground conductor layer 512.

Figure 4:
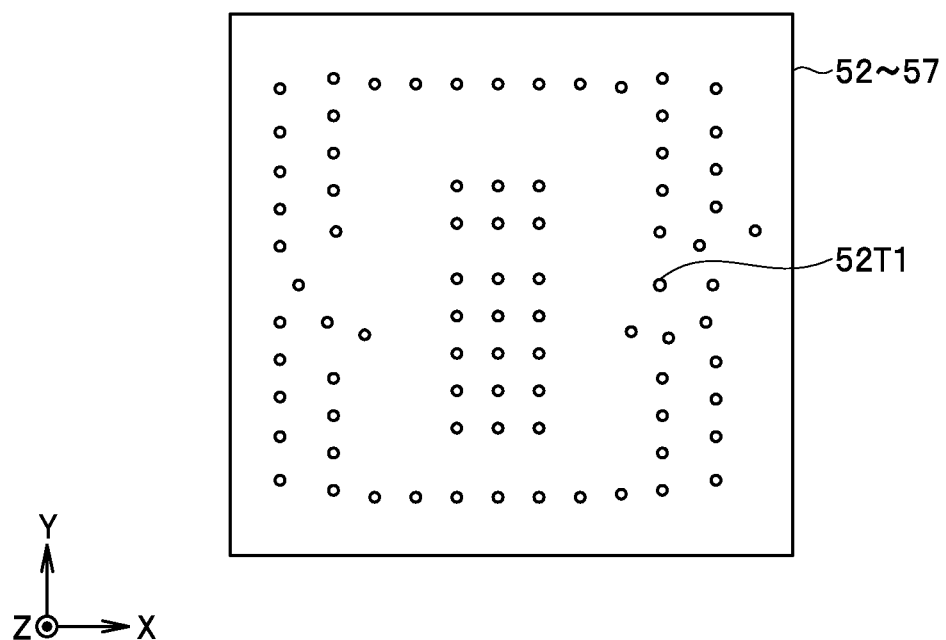
FIG. 4 is an explanatory diagram illustrating a patterned surface of each of second to seventh dielectric layers in the stack of the multilayered filter device in the first embodiment of the present invention.

FIG. 4 illustrates a patterned surface of each of the second to seventh dielectric layers 52 to 57. A particular through hole 52T1 is formed in each of the dielectric layers 52 to 57. The particular through hole 51T1 formed in the dielectric layer 51 is connected to the particular through hole 52T1 formed in the dielectric layer 52. In the dielectric layers 52 to 57, every vertically adjacent particular through holes 52T1 are connected to each other.

Figure 5:
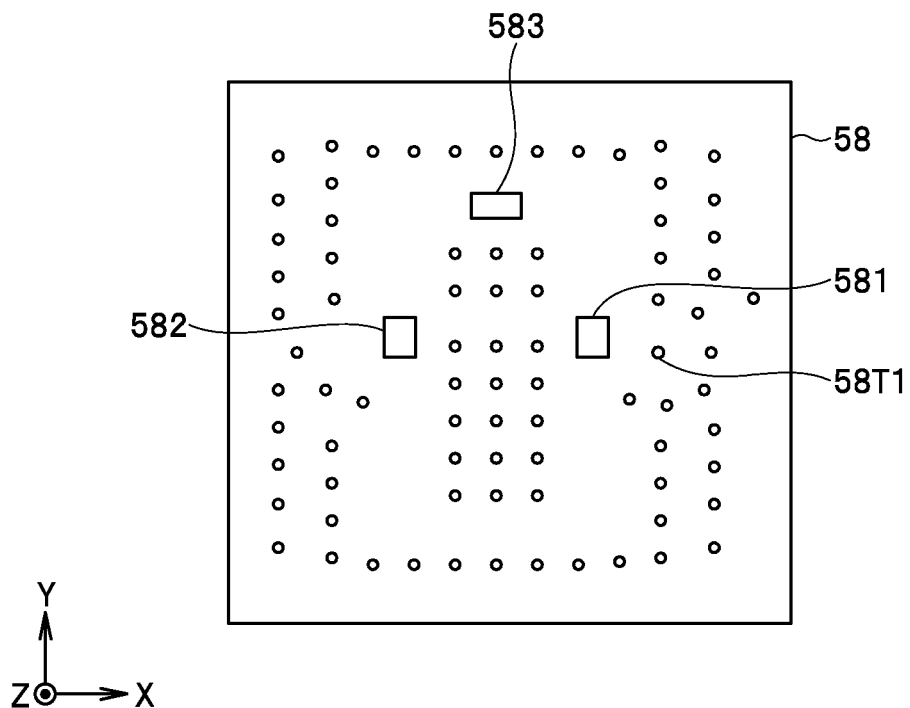
FIG. 5 is an explanatory diagram illustrating a patterned surface of an eighth dielectric layer in the stack of the multilayered filter device in the first embodiment of the present invention.

FIG. 5 illustrates a patterned surface of the eighth dielectric layer 58. Conductor layers 581, 582 and 583 are formed on the patterned surface of the dielectric layer 58. A particular through hole 58T1 is formed in the dielectric layer 58. The particular through hole 52T1 formed in the dielectric layer 57 is connected to the particular through hole 58T1.

Figure 6:
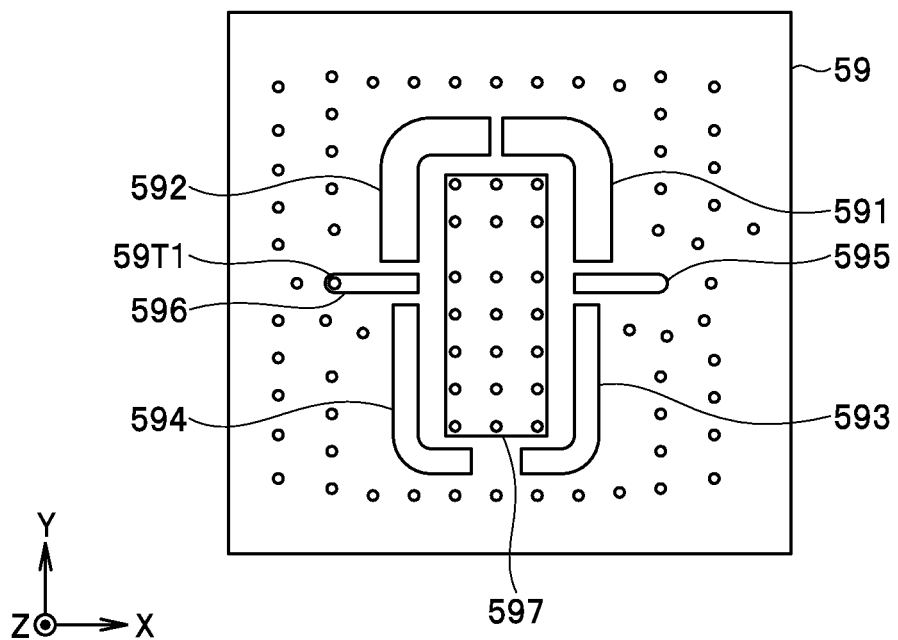
FIG. 6 is an explanatory diagram illustrating a patterned surface of a ninth dielectric layer in the stack of the multilayered filter device in the first embodiment of the present invention.

FIG. 6 illustrates a patterned surface of the ninth dielectric layer 59. Resonator conductor layers 591, 592, 593, and 594 and conductor layers 595 and 596, and a ground conductor layer 597 are formed on the patterned surface of the dielectric layer 59. Each of the conductor layers 591 to 596 has a first end and a second end located opposite to each other.

The conductor layer 591 includes a portion extending from the first end in the Y direction and a portion extending from the second end in the X direction. The conductor layer 592 includes a portion extending from the first end in the Y direction and a portion extending from the second end in the –X direction. The conductor layer 593 includes a portion extending from the first end in the –Y direction and a portion extending from the second end in the X direction. The conductor layer 594 includes a portion extending from the first end in the –Y direction and a portion extending from the second end in the –X direction. The conductor layer 595 extends from the first end toward the second end in the –X direction. The conductor layer 596 extends from the first end toward the second end in the X direction.

A particular through hole 59T1 is formed in the dielectric layer 59. The particular through hole 59T1 is connected to a portion of the conductor layer 596 near the first end thereof. The particular through hole 58T1 formed in the dielectric layer 58 is connected to a portion of the conductor layer 595 near the first end thereof. Part of a plurality of through holes formed in the dielectric layer 58 excluding the particular through hole 58T1 and part of a plurality of through holes formed in the dielectric layer 59 excluding the particular through hole 59T1 are connected to the ground conductor layer 597.

The first end of the conductor layer 591 is at a predetermined distance from and adjacent to a portion of the conductor layer 595 near the second end thereof. The first end of the conductor layer 592 is at a predetermined distance from and adjacent to a portion of the conductor layer 596 near the second end thereof. The second end of the conductor layer 591 and the second end of the conductor layer 592 are at a predetermined distance from each other and adjacent to each other.

The first end of the conductor layer 593 is at a predetermined distance from and adjacent to a portion of the conductor layer 595 near the second end thereof. The first end of the conductor layer 594 is at a predetermined distance from and adjacent to a portion of the conductor layer 596 near the second end thereof. The second end of the conductor layer 593 and the second end of the conductor layer 594 are at a predetermined distance from and adjacent to each other. The distance between the second end of the conductor layer 593 and the second end of the conductor layer 594 is greater than the distance between the second end of the conductor layer 591 and the second end of the conductor layer 592.

Figure 7:
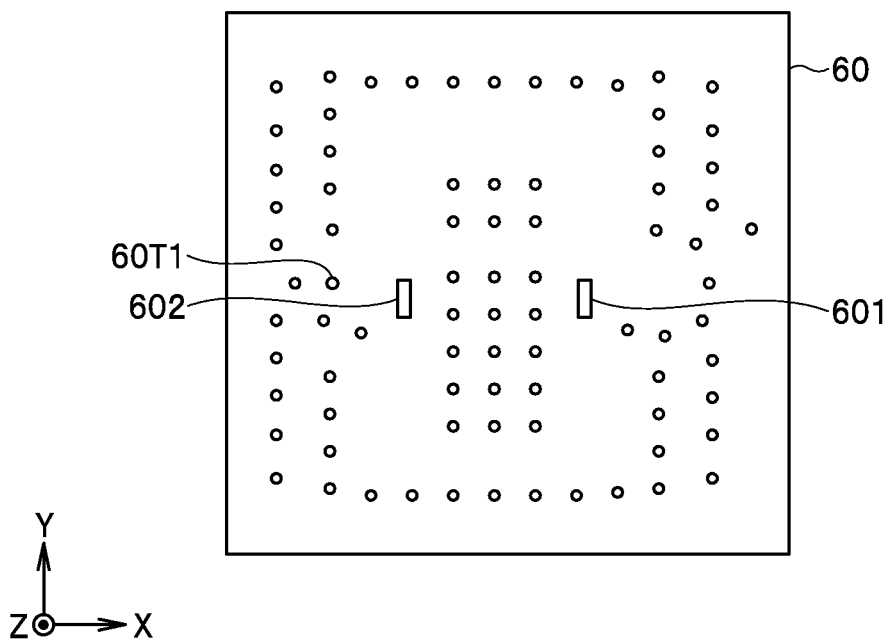
FIG. 7 is an explanatory diagram illustrating a patterned surface of a tenth dielectric layer in the stack of the multilayered filter device in the first embodiment of the present invention.

FIG. 7 illustrates a patterned surface of the tenth dielectric layer 60. Conductor layers 601 and 602 are formed on the patterned surface of the dielectric layer 60. A particular through hole 60T1 is formed in the dielectric layer 60. The particular through hole 59T1 formed in the dielectric layer 59 is connected to the particular through hole 60T1.

Figure 8:
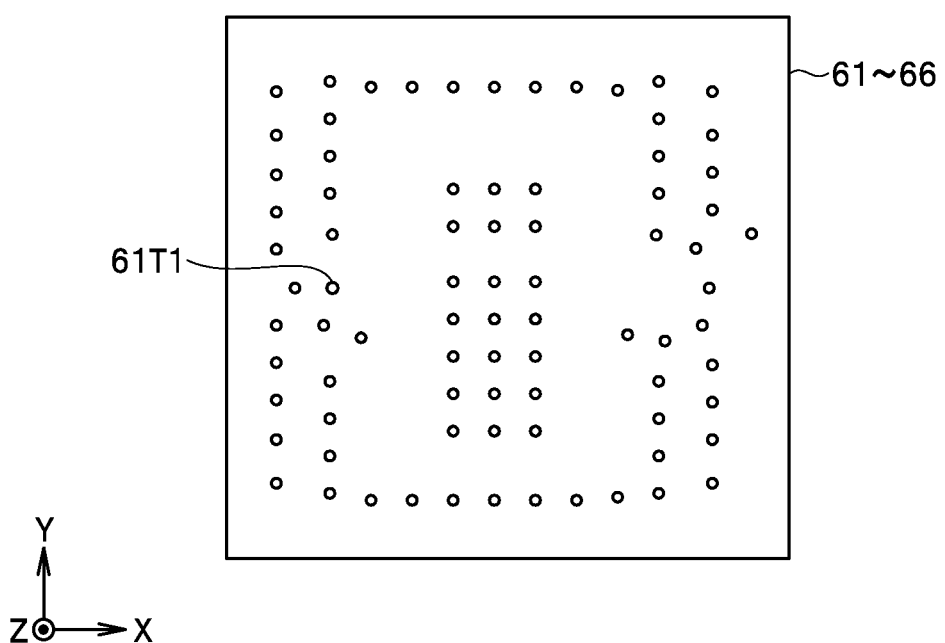
FIG. 8 is an explanatory diagram illustrating a patterned surface of each of eleventh to sixteenth dielectric layers in the stack of the multilayered filter device in the first embodiment of the present invention.

FIG. 8 illustrates a patterned surface of each of the eleventh to sixteenth dielectric layers 61 to 66. A particular through hole 61T1 is formed in each of the dielectric layers 61 to 66. The particular through hole 60T1 formed in the dielectric layer 60 is connected to the particular through hole 61T1 formed in the dielectric layer 61. In the dielectric layers 61 to 66, every vertically adjacent particular through holes 61T1 are connected to each other.

Figure 9:
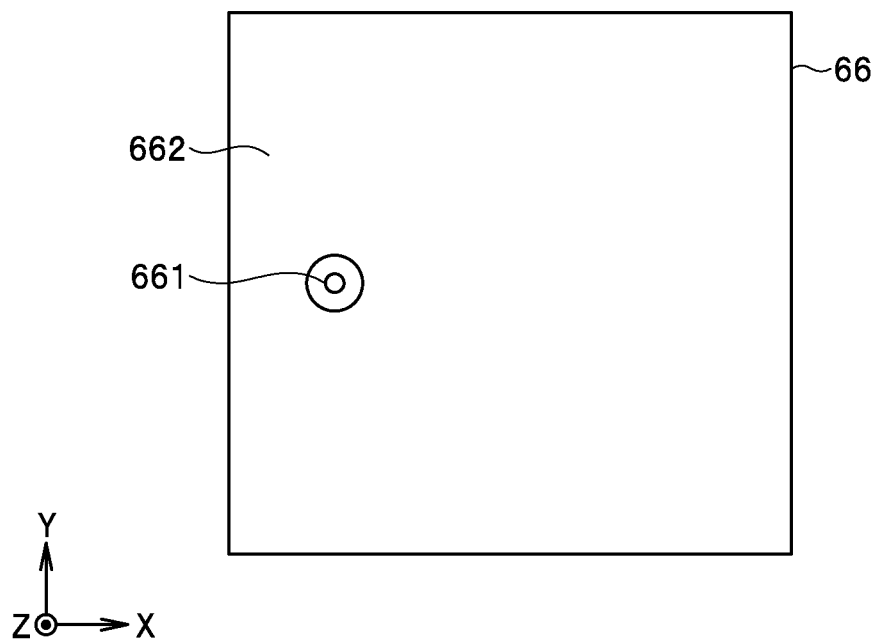
FIG. 9 is an explanatory diagram illustrating a terminal-formed surface of a sixteenth dielectric layer in the stack of the multilayered filter device in the first embodiment of the present invention.

FIG. 9 illustrates a terminal-formed surface being a surface opposite to the patterned surface of the sixteenth dielectric layer 66. The terminal 661 and the ground conductor layer 662 are formed on the terminal-formed surface of the dielectric layer 66. The particular through hole 61T1 formed in the dielectric layer 66 is connected to the terminal 661. A plurality of through holes formed in the dielectric layer 66 excluding the particular through hole 61T1 are connected to the ground conductor layer 662.

The stack 50 illustrated in FIG. 2 is formed by stacking the first to sixteenth dielectric layers 51 to 66 such that the patterned surface of the first dielectric layer 51 also serves as the bottom surface 50A of the stack 50 and the terminal-formed surface of the sixteenth dielectric layer 66 also serves as the top surface 50B of the stack 50.

Figure 10:
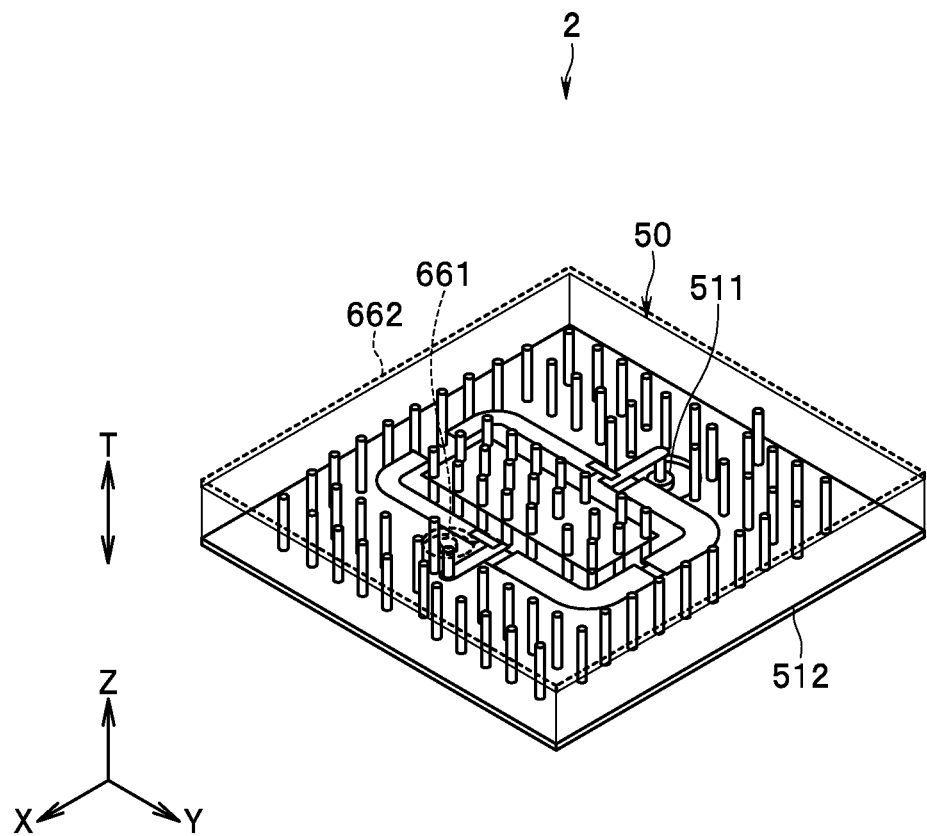
FIG. 10 is a perspective view illustrating inside of the stack of the multilayered filter device in the first embodiment of the present invention.

FIG. 10 illustrates inside of the stack 50 formed by stacking the first to sixteenth dielectric layers 51 to 66. As illustrated in FIG. 10, the plurality of conductor layers and the plurality of through holes illustrated in FIG. 3 to FIG. 9 are stacked inside the stack 50. The conductor layer 595 is connected to the terminal 511 via the particular through holes 51T1, 52T1, and 58T1. The conductor layer 596 is connected to the terminal 661 via the particular through holes 59T1, 60T1, and 61T1. The ground conductor layers 512, 597, and 662 are connected by the plurality of through holes excluding the particular through holes 51T1, 52T1, 58T1, 59T1, 60T1, and 61T1.

Correspondences of the components of the filter circuit 1 illustrated in FIG. 1 with the components in the stack 50 illustrated in FIG. 4 to FIG. 8 will now be described. The first resonator 11 of the first resonant circuit 10 is formed of the resonator conductor layer 591. The first resonator 12 of the first resonant circuit 10 is formed of the resonator conductor layer 592. The second resonator 21 of the second resonant circuit 20 is formed of the resonator conductor layer 593. The second resonator 22 of the second resonant circuit 20 is formed of the resonator conductor layer 594.

The first capacitor C11 is formed of the conductor layers 581, 591, and 595 and the dielectric layer 58 between these conductor layers. The first capacitor C12 is formed of the conductor layers 582, 592, and 596 and the dielectric layer 58 between these conductor layers. The second capacitor C21 is formed of the conductor layers 593, 595, and 601 and the dielectric layer 59 between these conductor layers. The second capacitor C22 is formed of the conductor layers 594, 596, and 602 and the dielectric layer 59 between these conductor layers.

The capacitor C13 is formed of the conductor layers 583, 591, and 592 and the dielectric layer 58 between these conductor layers.

Next, the structural features of the filter device 2 in the present embodiment will now be briefly described. In the filter device 2, the resonator conductor layers 591 to 594 are provided in a space surrounded by the ground conductor layers 512 and 662 and the plurality of through holes.

In the filter device 2, the area of each of the conductor layers 601 and 602 constituting the second capacitors C21 and C22 respectively is smaller than the area of each of the conductor layers 581 and 582 constituting the first capacitors C11 and C12 respectively.

The function and effects of the filter circuit 1 according to the present embodiment will now be described. As described above, in the present embodiment, the coupling of the second resonant circuit 20 and the two ports 3 and 4 is weaker than the coupling of the first resonant circuit 10 and the two ports 3 and 4. With this, according to the present embodiment, it is possible to incorporate the second resonant circuit 20 into the filter circuit 1 while suppressing the effect of the second resonant circuit 20.

In the present embodiment, in particular, the first resonant circuit 10 configures a band-pass filter, and the second resonant circuit 20 configures a band elimination filter. The effect of the second resonant circuit 20 is concretely to increase, in frequency response of the insertion loss of the filter circuit 1 (frequency response of the insertion loss of the band-pass filter), the insertion loss of the frequency region close to the center frequency of the stop band of the band elimination filter configured by the second resonant circuit 20. Hence, according to the present embodiment, it is possible to incorporate the second resonant circuit 20 into the filter circuit 1 while reducing the insertion loss in the frequency region to a required amount. Hence, according to the present embodiment, the center frequency of the stop band of the band elimination filter configured by the second resonant circuit 20 is adjusted to a frequency close to the passband of the band-pass filter configured by the first resonant circuit 10, to thereby be able to obtain characteristics of abrupt change of the insertion loss in the frequency region close to the passband of the filter circuit 1, while suppressing an increase of the insertion loss of the passband of the filter circuit 1.

Note that, also by increasing the number of resonators configuring the band-pass filter, it is possible to obtain characteristics of abrupt change of insertion loss in a frequency region close to the passband of the band-pass filter. However, there occurs a problem that the insertion loss of the passband increases as the number of resonators increases when comparison is made with the resonators having the same Q value.

In contrast to this, in the present embodiment, the number of resonators included in the first resonant circuit 10 is only two. According to the present embodiment, it is possible to obtain characteristics of abrupt change of insertion loss in a frequency region close to the passband without increasing the number of resonators constituting the band-pass filter. With this, according to the present embodiment, it is possible to suppress an increase of insertion loss of the passband. According to the present embodiment, it is possible to miniaturize the filter circuit 1 and the filter device 2.

The center frequency of the stop band of the band elimination filter configured by the second resonant circuit 20 may be present in a lower frequency region from the passband of the band-pass filter configured by the first resonant circuit 10 or may be present in a higher frequency region from the passband.

Figure 11:
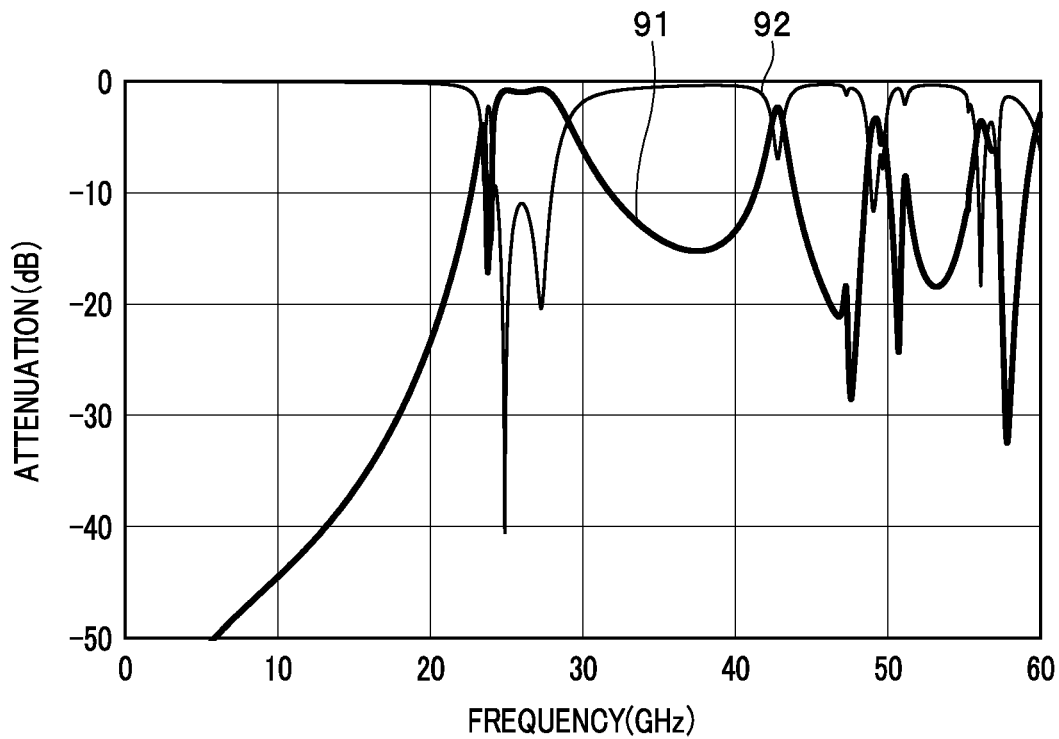
FIG. 11 is a characteristic diagram illustrating an example of frequency response of a filter circuit according to the first embodiment of the present invention.
Figure 12:
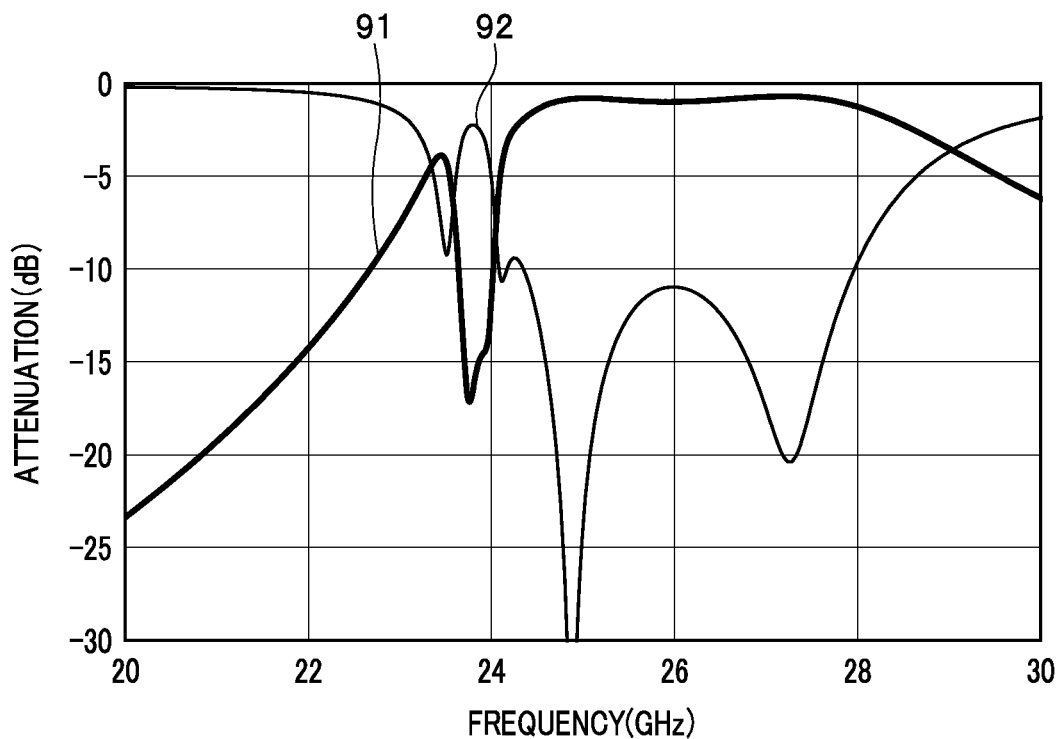
FIG. 12 is a characteristic diagram illustrating part of the frequency response illustrated in FIG. 11, in an enlarged manner.

Next, an example of frequency response of the filter circuit 1 according to the present embodiment will be described. FIG. 11 is a characteristic diagram illustrating an example of frequency response of the filter circuit 1. FIG. 12 is a characteristic diagram illustrating part of the frequency response illustrated in FIG. 11, concretely a frequency region near the passband, in an enlarged manner. In each of FIG. 11 and FIG. 12, the horizontal axis represents frequency, and the vertical axis represents attenuation. In each of FIG. 11 and FIG. 12, the curved line to which the reference numeral 91 is added represents insertion loss, and the curved line to which the reference numeral 92 is added represents reflection loss.

In the example illustrated in FIG. 11 and FIG. 12, the center frequency of the stop band of the band elimination filter configured by the second resonant circuit 20 is present in a lower frequency region from the passband of the band-pass filter configured by the first resonant circuit 10. As illustrated in FIG. 11 and FIG. 12, according to the present embodiment, it is possible to obtain characteristics of abrupt change of insertion loss (attenuation) in a frequency region close to the passband. The amount of insertion loss in the passband (absolute value of attenuation) is a sufficiently small value.

Second Embodiment

Figure 13:
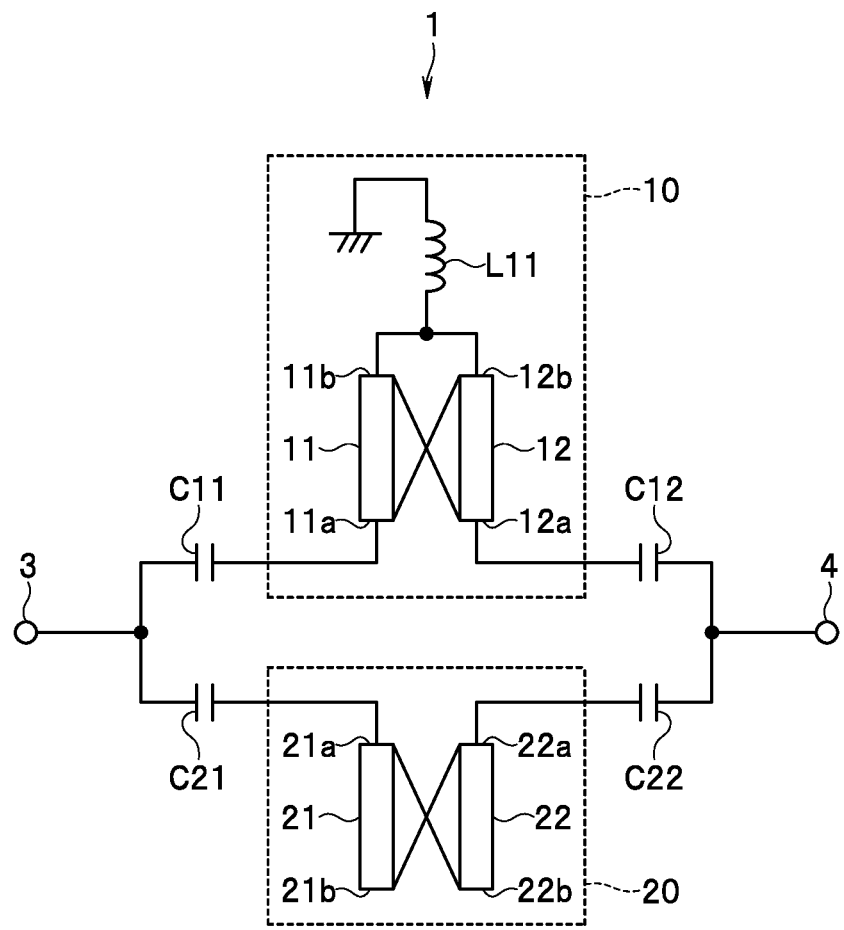
FIG. 13 is a circuit diagram illustrating a circuit configuration of a filter circuit according to a second embodiment of the present invention.

A second embodiment of the present invention will now be described. First, reference is made to FIG. 13 to briefly describe a filter circuit 1 according to the present embodiment in terms of differences compared to the filter circuit of the first embodiment. FIG. 13 is a circuit diagram illustrating a circuit configuration of the filter circuit 1 according to the present embodiment.

In the present embodiment, each of the first resonators 11 and 12 of the first resonant circuit 10 is a quarter-wave resonator with one end being short-circuited and the other end being open. The second end 11b of the first resonator 11 and the second end 12b of the first resonator 12 are each connected to the ground. In FIG. 13, the reference numeral L11 represents an inductance component of a line connecting the first resonators 11 and 12 and the ground.

Reference is now made to FIG. 14 to FIG. 20 to describe the filter device 2 according to the present embodiment. The configuration of the filter device 2 according to the present embodiment is the same as the configuration of the filter device 2 of the first embodiment excluding a plurality of dielectric layers constituting the stack 50. In the present embodiment, the stack 50 includes sixteen dielectric layers 71 to 86 stacked together instead of the dielectric layers 51 to 66 of the first embodiment. In the following, the sixteen dielectric layers 71 to 86 will be referred to as the first to sixteenth dielectric layers 71 to 86 in the order from bottom to top. In FIG. 14 to FIG. 20, each circle represents a through hole.

Figure 14:
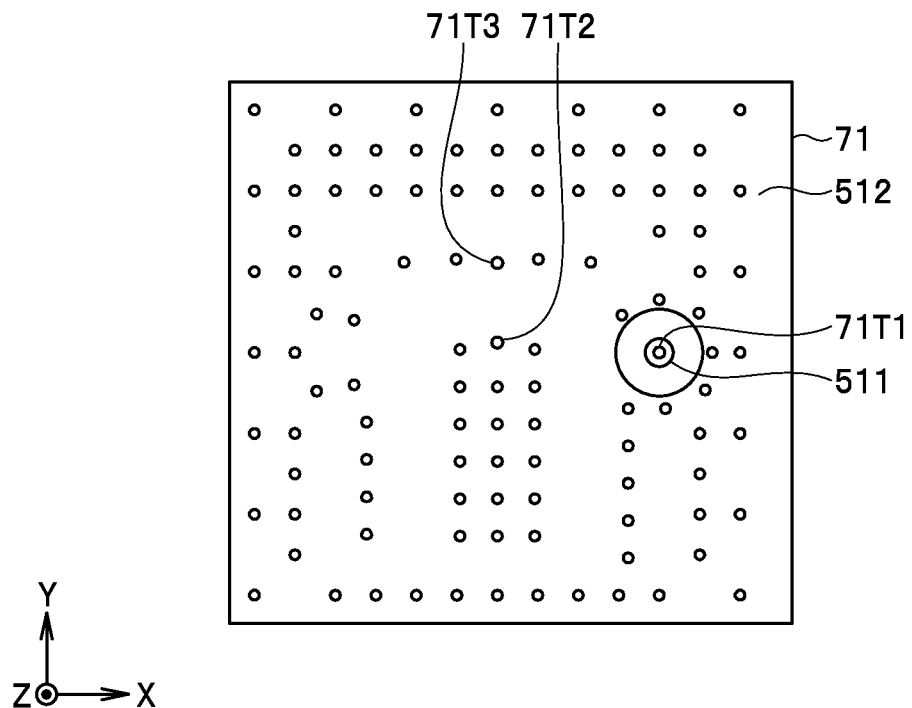
FIG. 14 is an explanatory diagram illustrating a patterned surface of a first dielectric layer in a stack of a multilayered filter device in the second embodiment of the present invention.

FIG. 14 illustrates a patterned surface of the first dielectric layer 71. The terminal 511 and the ground conductor layer 512 are formed on the patterned surface of the dielectric layer 71. A particular through hole 71T1 connected to the terminal 511 is formed in the dielectric layer 71. A plurality of through holes formed in the dielectric layer 71 excluding the particular through hole 71T1 are connected to the ground conductor layer 512. The plurality of through holes connected to the ground conductor layer 512 include particular through holes 71T2 and 71T3.

Figure 15:
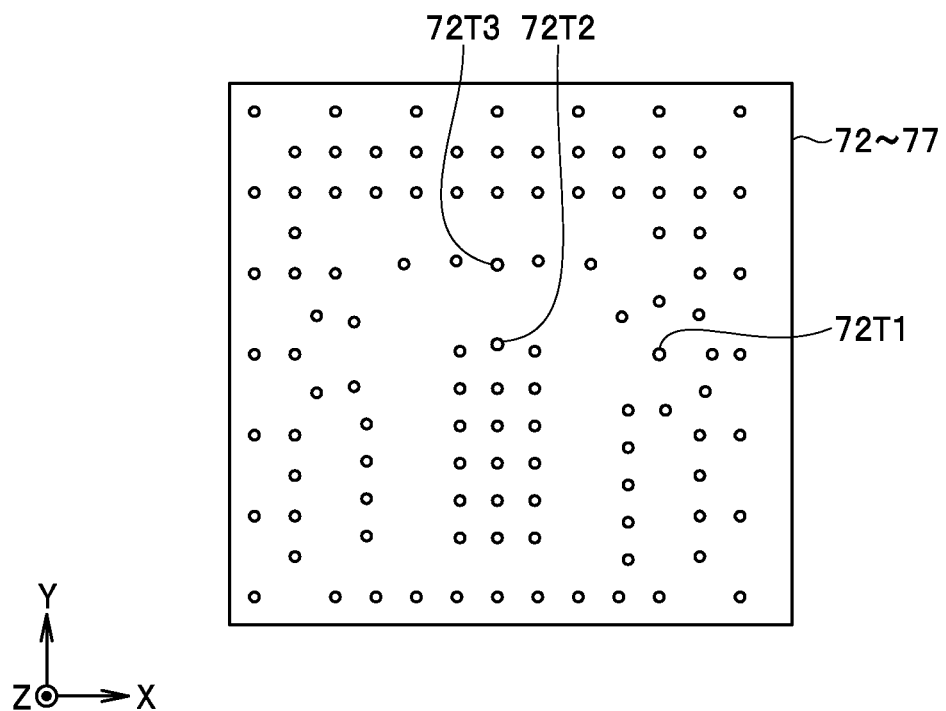
FIG. 15 is an explanatory diagram illustrating a patterned surface of each of second to seventh dielectric layers in the stack of the multilayered filter device in the second embodiment of the present invention.

FIG. 15 illustrates a patterned surface of each of the second to seventh dielectric layers 72 to 77. Particular through holes 72T1, 72T2, and 72T3 are formed in each of the dielectric layers 72 to 77. The particular through holes 71T1 to 71T3 formed in the dielectric layer 71 are connected respectively to the particular through holes 72T1 to 72T3 formed in the dielectric layer 72. In the dielectric layers 72 to 77, every vertically adjacent through holes denoted by the same reference signs are connected to each other.

Figure 16:
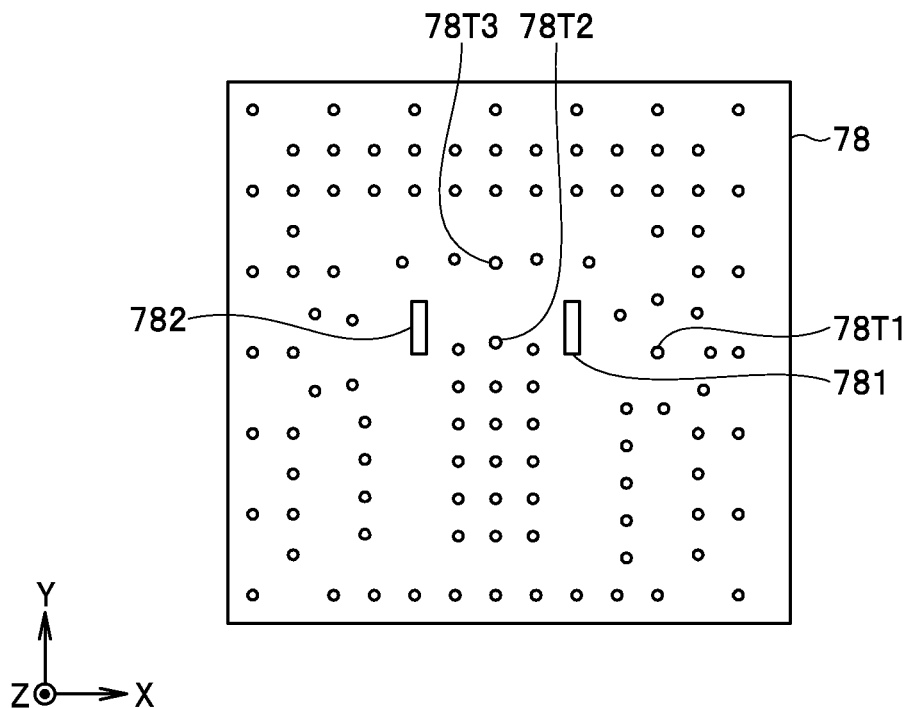
FIG. 16 is an explanatory diagram illustrating a patterned surface of an eighth dielectric layer in the stack of the multilayered filter device in the second embodiment of the present invention.

FIG. 16 illustrates a patterned surface of the eighth dielectric layer 78. Conductor layers 781 and 782 are formed on the patterned surface of the dielectric layer 78. Particular through holes 78T1, 78T2, and 78T3 are formed in the dielectric layer 78. The particular through holes 72T1 to 72T3 formed in the dielectric layer 77 are connected to the particular through holes 78T1 to 78T3, respectively.

Figure 17:
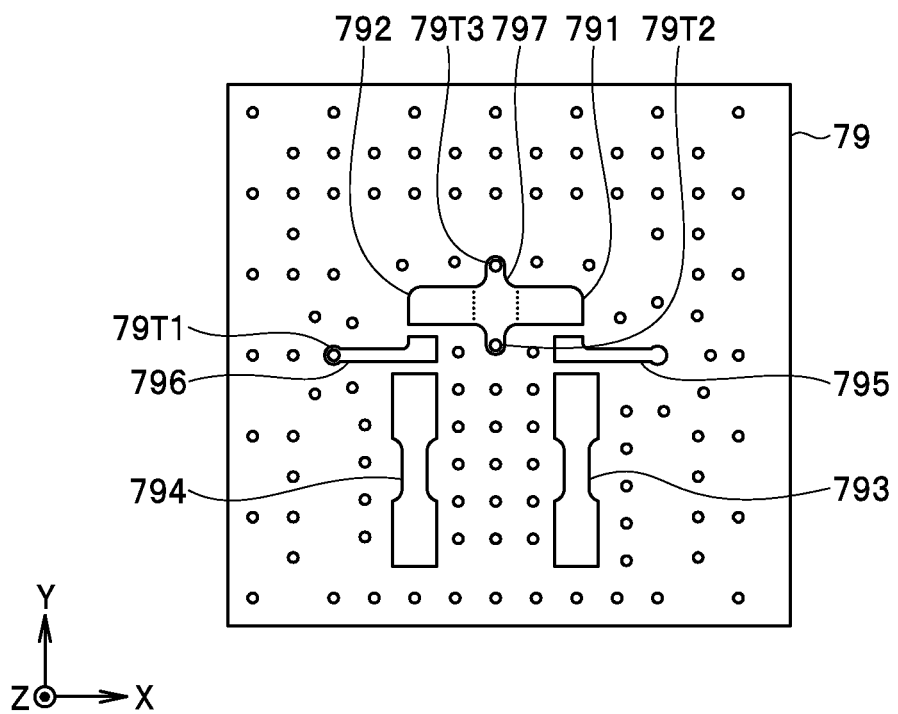
FIG. 17 is an explanatory diagram illustrating a patterned surface of a ninth dielectric layer in the stack of the multilayered filter device in the second embodiment of the present invention.

FIG. 17 illustrates a patterned surface of the ninth dielectric layer 79. Resonator conductor layers 791, 792, 793, and 794 and conductor layers 795 and 796, and a ground conductor layer 797 are formed on the patterned surface of the dielectric layer 79. Each of the conductor layers 791 to 796 has a first end and a second end located opposite to each other.

The conductor layer 791 and 795 each extend from the first end toward the second end in the −X direction. The conductor layers 792 and 796 each extend from the first end toward the second end in the X direction. The conductor layers 793 and 794 each extend from the first end toward the second end in the −Y direction.

Particular through holes 79T1, 79T2, and 79T3 are formed in the dielectric layer 79. The particular through hole 79T1 is connected to a portion of the conductor layer 796 near the first end thereof. The particular through hole 78T1 formed in the dielectric layer 78 is connected to a portion of the conductor layer 795 near the first end thereof. The particular through holes 78T2 and 78T3 formed in the dielectric layer 78 and the particular through holes 79T2 and 79T3 are connected to the ground conductor layer 797.

The portion near the first end of the conductor layer 791 is at a predetermined distance from and adjacent to a portion of the conductor layer 795 near the second end thereof. The portion near the first end of the conductor layer 792 is at a predetermined distance from and adjacent to a portion of the conductor layer 796 near the second end thereof. The second ends of the conductor layers 791 and 792 are connected to the ground conductor layer 797. In FIG. 17, the boundary between each of the conductor layers 791 and 792 and the ground conductor layer 797 is indicated by a dotted line.

The first end of the conductor layer 793 is at a predetermined distance from and adjacent to a portion of the conductor layer 795 near the second end thereof. The first end of the conductor layer 794 is at a predetermined distance from and adjacent to a portion of the conductor layer 796 near the second end thereof.

Figure 18:
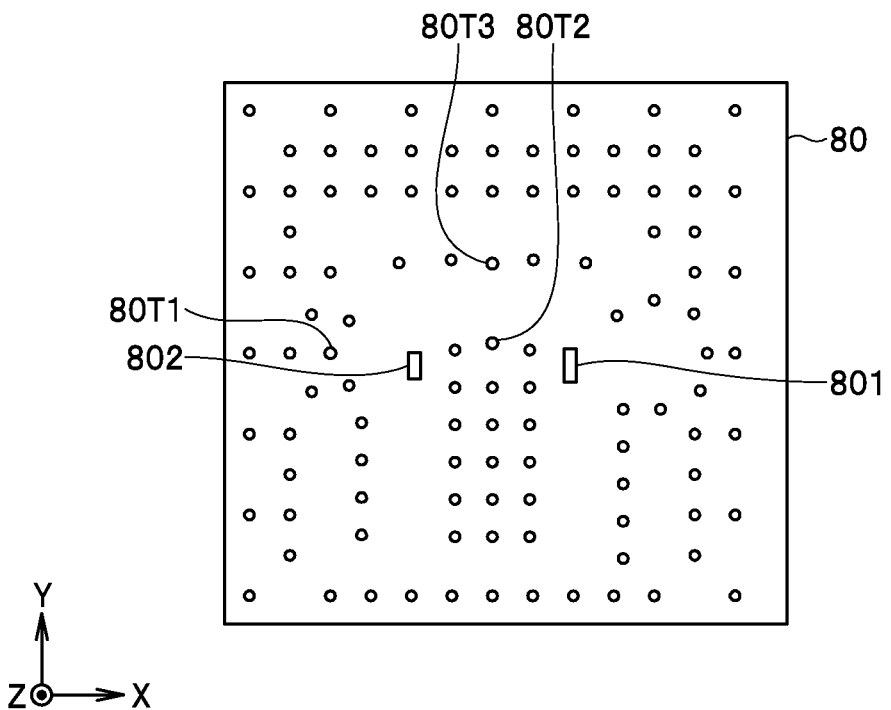
FIG. 18 is an explanatory diagram illustrating a patterned surface of a tenth dielectric layer in the stack of the multilayered filter device in the second embodiment of the present invention.

FIG. 18 illustrates a patterned surface of the tenth dielectric layer 80. Conductor layers 801 and 802 are formed on the patterned surface of the dielectric layer 80. Particular through holes 80T1, 80T2, and 80T3 are formed in the dielectric layer 80. The particular through holes 79T1 to 79T3 formed in the dielectric layer 79 are connected to the particular through holes 80T1 to 80T3, respectively.

Figure 19:
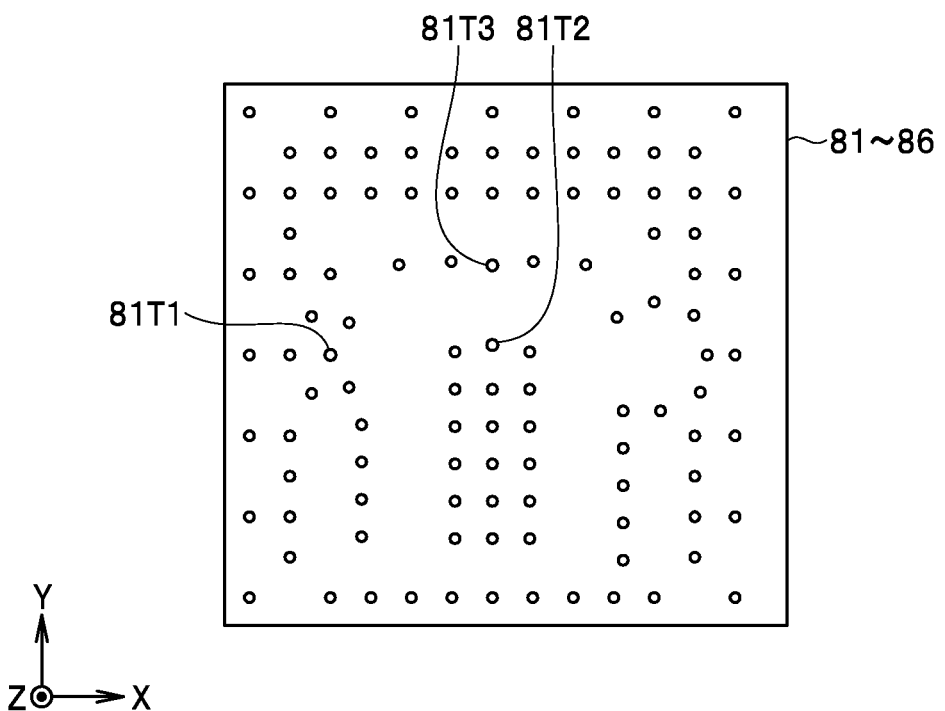
FIG. 19 is an explanatory diagram illustrating a patterned surface of each of eleventh to sixteenth dielectric layers in the stack of the multilayered filter device in the second embodiment of the present invention.

FIG. 19 illustrates a patterned surface of each of the eleventh to sixteenth dielectric layers 81 to 86. Particular through holes 81T1, 81T2, and 81T3 are formed in each of the dielectric layers 81 to 86. The particular through holes 80T1 to 80T3 formed in the dielectric layer 80 are connected respectively to the particular through holes 81T1 to 81T3 formed in the dielectric layer 81. In the dielectric layers 81 to 86, every vertically adjacent through holes denoted by the same reference signs are connected to each other.

Figure 20:
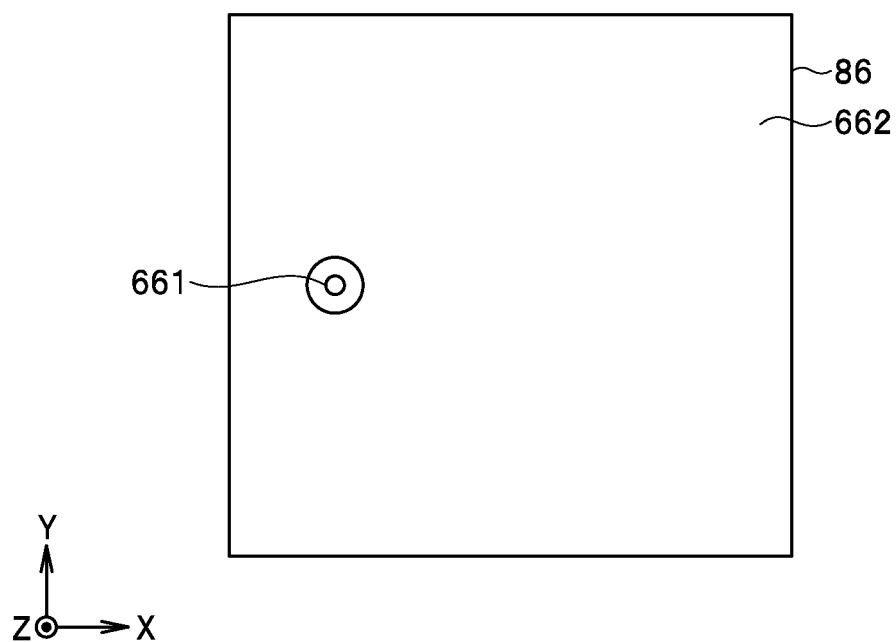
FIG. 20 is an explanatory diagram illustrating a terminal-formed surface of the sixteenth dielectric layer in the stack of the multilayered filter device in the second embodiment of the present invention.

FIG. 20 illustrates a terminal-formed surface being a surface opposite to the patterned surface of the sixteenth dielectric layer 86. A terminal 861 and a ground conductor layer 862 are formed on the terminal-formed surface of the dielectric layer 86. The particular through holes 81T1 formed in the dielectric layer 86 is connected to the terminal 661. A plurality of through holes formed in the dielectric layer 86 including the particular through holes 81T2 and 81T3 formed in the dielectric layer 86 (excluding the particular through hole 81T1) are connected to the ground conductor layer 662.

The stack 50 in the present embodiment is formed by stacking the first to sixteenth dielectric layers 71 to 86 such that the patterned surface of the first dielectric layer 71 also serves as the bottom surface 50A of the stack 50 and the terminal-formed surface of the sixteenth dielectric layer 86 also serves as the top surface 50B of the stack 50.

Figure 21:
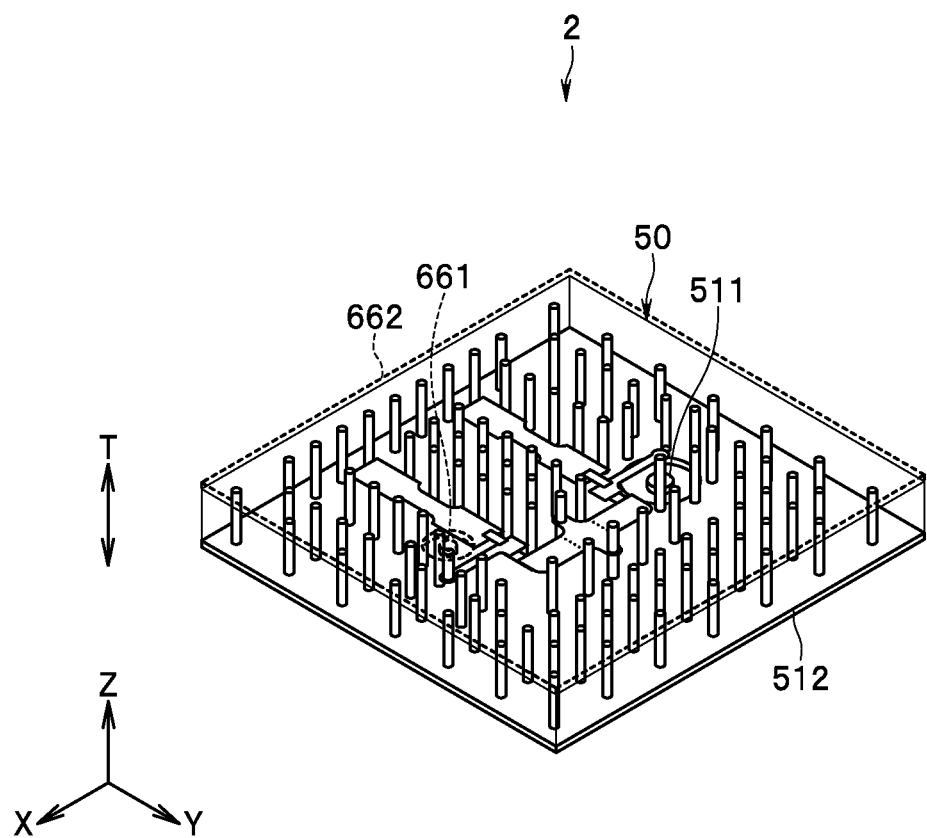
FIG. 21 is a perspective view illustrating inside of the stack of the multilayered filter device in the second embodiment of the present invention.

FIG. 21 illustrates inside of the stack 50 formed by stacking the first to sixteenth dielectric layers 71 to 86. As illustrated in FIG. 21, the plurality of conductor layers and the plurality of through holes illustrated in FIG. 14 to FIG. 20 are stacked inside the stack 50. The conductor layer 795 is connected to the terminal 511 via the particular through holes 71T1, 72T1, and 78T1. The conductor layer 796 is connected to the terminal 661 via the particular through holes 79T1, 80T1, and 81T1. The ground conductor layers 512, 662, and 797 are connected to each other via the plurality of through holes excluding the particular through holes 51T1, 52T1, 58T1, 59T1, 60T1, and 61T1. In particular, the ground conductor layer 797 is connected to the ground conductor layer 512 via the particular through holes 71T2, 71T3, 72T2, 72T3, 78T2, and 78T3 and is connected to the ground conductor layer 662 via the particular through holes 79T2, 79T3, 80T2, 80T3, 81T2, and 81T3.

Correspondences of the components of the filter circuit 1 illustrated in FIG. 13 with the components in the stack 50 illustrated in FIG. 15 to FIG. 19 will now be described. The first resonator 11 of the first resonant circuit 10 is formed of the resonator conductor layer 791. The first resonator 12 of the first resonant circuit 10 is formed of the resonator conductor layer 792. The second resonator 21 of the second resonant circuit 20 is formed of the resonator conductor layer 793. The second resonator 22 of the second resonant circuit 20 is formed of the resonator conductor layer 794.

The first capacitor C11 is formed of the conductor layers 781, 791, and 795 and the dielectric layer 78 between these conductor layers. The first capacitor C12 is formed of the conductor layers 782, 792, and 796 and the dielectric layer 78 between these conductor layers. The second capacitor C21 is formed of the conductor layers 793, 795, and 801 and the dielectric layer 79 between these conductor layers. The second capacitor C22 is formed of the conductor layers 794, 796, and 802 and the dielectric layer 79 between these conductor layers.

Next, the structural features of the filter device 2 in the present embodiment will now be briefly described. In the filter device 2, the resonator conductor layers 791 to 794 are provided in a space surrounded by the ground conductor layers 512 and 662 and the plurality of through holes.

In the filter device 2, the area of each of the conductor layers 801 and 802 constituting the second capacitors C21 and C22 respectively is smaller than the area of each of the conductor layers 781 and 782 constituting the first capacitors C11 and C12 respectively.

The particular through holes 71T2, 71T3, 72T2, 72T3, 78T2, 78T3, 79T2, 79T3, 80T2, 80T3, 81T2, and 81T3 are electrically connected to the ground conductor layers 512, 662, and 797. The ground conductor layers 512, 662, and 797 are electrically connected to the ground. In the following, the particular through holes 71T2, 71T3, 72T2, 72T3,

78T2, 78T3, 79T2, 79T3, 80T2, 80T3, 81T2, and 81T3 are referred to as a plurality of particular through holes connected to the ground.

The plurality of particular through holes connected to the ground include two through holes arranged in a direction orthogonal to the stacking direction T. The two through holes are concretely a pair of particular through holes 71T2 and 71T3, a pair of particular through holes 72T2 and 72T3, a pair of particular through holes 78T2 and 78T3, a pair of particular through holes 79T2 and 79T3, a pair of particular through holes 80T2 and 80T3, or a pair of particular through holes 81T2 and 81T3. The two particular through holes included in these pairs are arranged in a direction orthogonal to at least one of the direction in which the resonator conductor layer 791 extends and the direction in which the resonator conductor layer 792 extends to be described later. In the present embodiment, the two particular through holes included in these pairs are arranged in a direction parallel to the Y direction.

The resonator conductor layer 791 extends in a first direction becoming away from the plurality of particular through holes connected to the ground. The resonator conductor layer 791 extends in a second direction becoming away from the plurality of particular through holes connected to the ground. In the present embodiment, in particular, the resonator conductor layers 791 and 792 are each electrically connected to the plurality of particular through holes connected to the ground.

The first and second directions are each a direction orthogonal to the stacking direction T. In the present embodiment, in particular, the first direction is the X direction, and the second direction is the −X direction. Hence, the first direction and the second direction are directions opposite to each other.

The resonator conductor layers 793 and 794 each include a narrow portion and two wide portions located at both sides of the narrow portion. The second resonators 21 and 22 formed of the resonator conductor layers 793 and 794 are each a stepped impedance resonator.

The particular function and effects of the filter device 2 in the present embodiment will now be described. In the present embodiment, the resonator conductor layers 791 and 792 each extend in the direction becoming away from the plurality of particular through holes connected to the ground as described above. Hence, in the present embodiment, when the resonator conductor layers 791 and 792 or the plurality of particular through holes connected to the resonator conductor layers 791 and 792 are shifted in a direction parallel to the X direction due to manufacturing variations, one of the resonator conductor layers 791 and 792 is longer while the other is shorter. With this, according to the present embodiment, it is possible to cancel characteristic change of resonators attributable to change in length of the resonator conductor layers. Consequently, according to the present embodiment, it is possible to suppress characteristic change of the first resonant circuit 10, i.e., the band-pass filter, due to manufacturing variations.

In the present embodiment, the plurality of particular through holes connected to the ground include the two through holes arranged in a direction orthogonal to the stacking direction T and also orthogonal to at least one of the direction in which the resonator conductor layer 791 extends and the direction in which the resonator conductor layer 792 extends. In the present embodiment, in particular, the two through holes are arranged in a direction orthogonal to both the direction in which the resonator conductor layer 791 extends and the direction in which the resonator conductor layer 792 extends. Hence, when the resonator conductor layers 791 and 792 or the plurality of particular through holes connected to the resonator conductor layers 791 and 792 are shifted in a direction parallel to the Y direction, the resonator conductor layers 791 and 792 change little in length. Also with this, according to the present embodiment, it is possible to suppress characteristic change of the first resonant circuit 10, i.e., the band-pass filter, due to manufacturing variations.

Now, the foregoing effects of the present embodiment will be described with reference to results of a simulation. In the simulation, a model of an example and a model of a comparative example were used. The model of the example and the model of the comparative example are both models of a band-pass filter including a ground conductor layer and two resonator conductor layers extending from the ground conductor layer.

In the model of the example, as in the filter device 2 of the present embodiment, the two resonator conductor layers are arranged so as to sandwich the ground conductor layer and extend in directions opposite to each other. In the model of the comparative example, the two resonator conductor layers extend from the ground conductor layer in the same direction. Note that, in the simulation, the longitudinal direction of the resonator conductor layers (directions parallel to the extending directions) were the same between the model of the example and the model of the comparative example. In the simulation, the length of each of the two resonator conductor layers of the model of the example was 700 μm, and the length of each of the two resonator conductor layers of the model of the comparative example was 855 μm.

In the simulation, obtained were the shift amount of the low-frequency cutoff, which is the lower limit of the passband, and the shift amount of the high-frequency cutoff, which is the upper limit of the passband, when the two resonator conductor layers were shifted by 15 μm in the longitudinal direction of the resonator conductor layers. In the model of the example, when the two resonator conductor layers are shifted by 15 μm in the longitudinal direction of the resonator conductor layers, one of the two resonator conductor layers becomes shorter by 15 μm while the other becomes longer by 15 μm. In the model of the comparative example, when the two resonator conductor layers are shifted by 15 μm in the longitudinal direction of the resonator conductor layers, both of the two resonator conductor layers become shorter by 15 μm or become longer by 15 μm. In the simulation, the two resonator conductor layers were shifted so that both of the two resonator conductor layers would become longer.

In a case where the two resonator conductor layers were shifted as described above, the shift amount of the low-frequency cutoff was 0.80% while the shift amount of the high-frequency cutoff was 1.25% in the model of the comparative example. In the model of the example, the shift amount of the low-frequency cutoff was 0.11% while the shift amount of the high-frequency cutoff was 0.11%. As understood from the results of the simulation, according to the present embodiment, it is possible to suppress change in low-frequency cutoff and high-frequency cutoff due to manufacturing variations.

Figure 22:
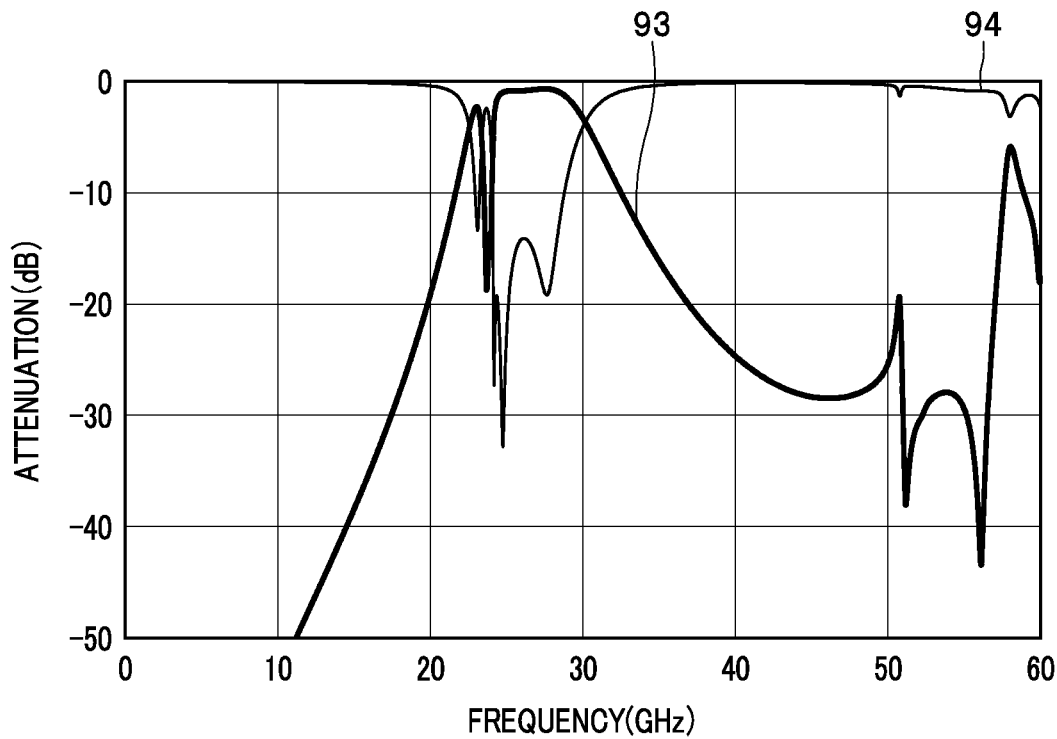
FIG. 22 is a characteristic diagram illustrating an example of frequency response of a filter circuit according to the second embodiment of the present invention.
Figure 23:
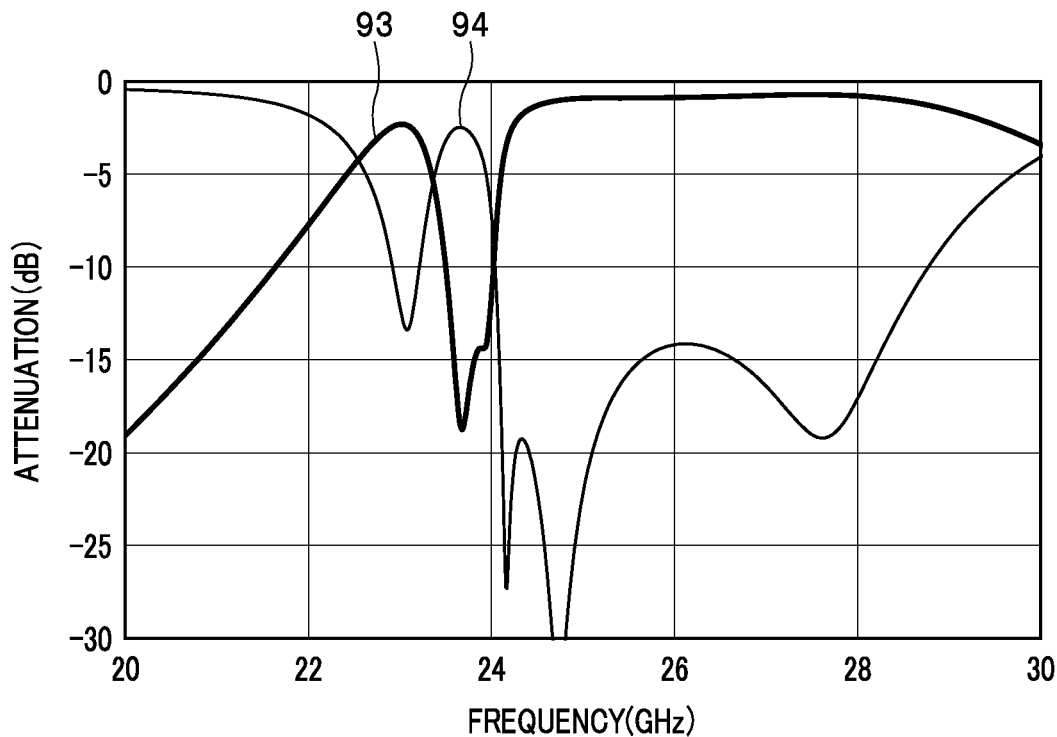
FIG. 23 is a characteristic diagram illustrating part of the frequency response illustrated in FIG. 22, in an enlarged manner.

Next, an example of frequency response of the filter circuit 1 according to the present embodiment will be described. FIG. 22 is a characteristic diagram illustrating an example of frequency response of the filter circuit 1. FIG. 23 is a characteristic diagram illustrating part of the frequency response illustrated in FIG. 22, concretely a frequency region near the passband, in an enlarged manner. In each of FIG. 22 and FIG. 23, the horizontal axis represents frequency, and the vertical axis represents attenuation. In each of FIG. 22 and FIG. 23, the curved line to which the reference numeral 93 is added represents insertion loss, and the curved line to which the reference numeral 94 is added represents reflection loss.

In the example illustrated in FIG. 22 and FIG. 23, the center frequency of the stop band of the band elimination filter configured by the second resonant circuit 20 is present in a lower frequency region from the passband of the band-pass filter configured by the first resonant circuit 10. As illustrated in FIG. 22 and FIG. 23, according to the present embodiment, it is possible to obtain characteristics of abrupt change of insertion loss (attenuation) in a frequency region close to the passband of the band-pass filter. The amount of insertion loss in the passband (absolute value of attenuation) is a sufficiently small value.

The other configuration, function, and effects of the present embodiment are the same as those of the first embodiment.

Third Embodiment

Figure 24:
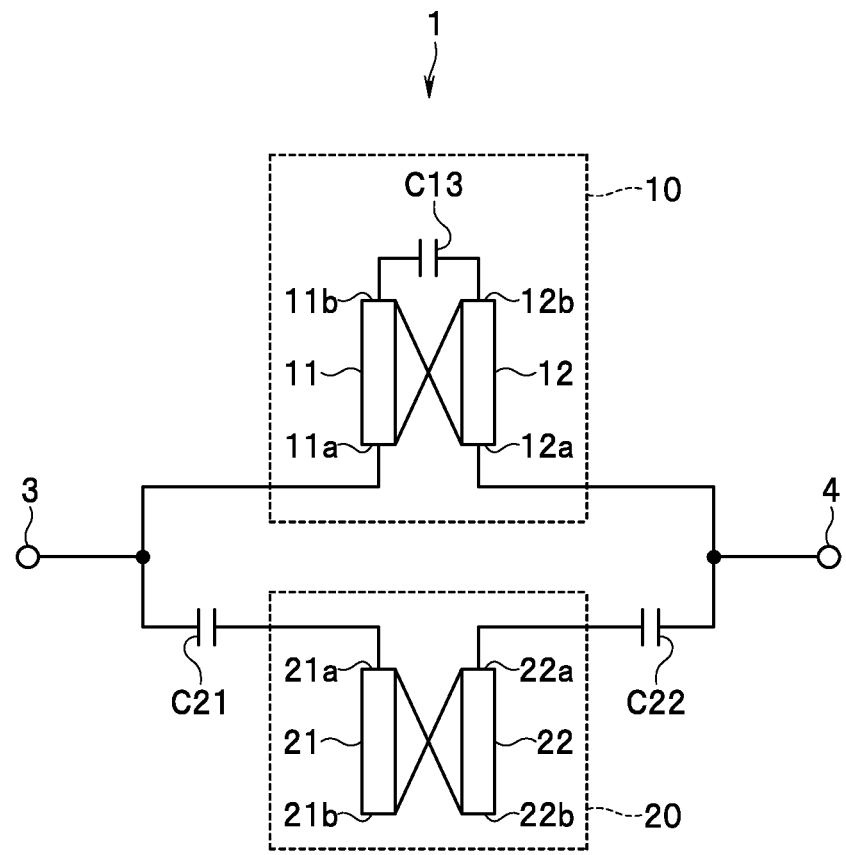
FIG. 24 is a circuit diagram illustrating a circuit configuration of the filter circuit according to the second embodiment of the present invention.

A third embodiment of the present invention will now be described with reference to FIG. 24. FIG. 24 is a circuit diagram illustrating a circuit configuration of the filter circuit 1 according to the present embodiment.

The configuration of the filter circuit 1 according to the present embodiment is different from that of the first embodiment in terms of the following respects. In the present embodiment, the first capacitors C11 and C12 of the first embodiment are not provided. Hence, the first resonant circuit 10 is directly coupled with the ports 3 and 4. Concretely, the first end 11a of the first resonator 11 of the first resonant circuit 10 is directly coupled with the port 3, and the first end 12a of the first resonator 12 of the first resonant circuit 10 is directly coupled with the port 4.

When coupling between a resonant circuit and a port is capacitive coupling as described in the first embodiment, the coupling becomes stronger as the capacitance of the capacitor capacitive-coupling the resonant circuit and the port increases. Here, when the resonant circuit and the port are directly coupled with each other, substantially the same applies to a high-frequency region as that of a case of capacitive coupling using infinite capacitance. Accordingly, in the present embodiment, each of the coupling between the first resonant circuit 10 and the port 3 and the coupling between the first resonant circuit 10 and the port 4 is stronger than corresponding one of the first embodiment. Coupling of the first resonant circuit 10 and the two ports 3 and 4 is stronger than coupling of the second resonant circuit 20 and one of the ports 3 and 4.

Note that the configuration of the first resonant circuit 10 may be the same as that of the second embodiment. The other configuration, function, and effects of the present embodiment are similar to those of the first or second embodiment.

Fourth Embodiment

Figure 25:
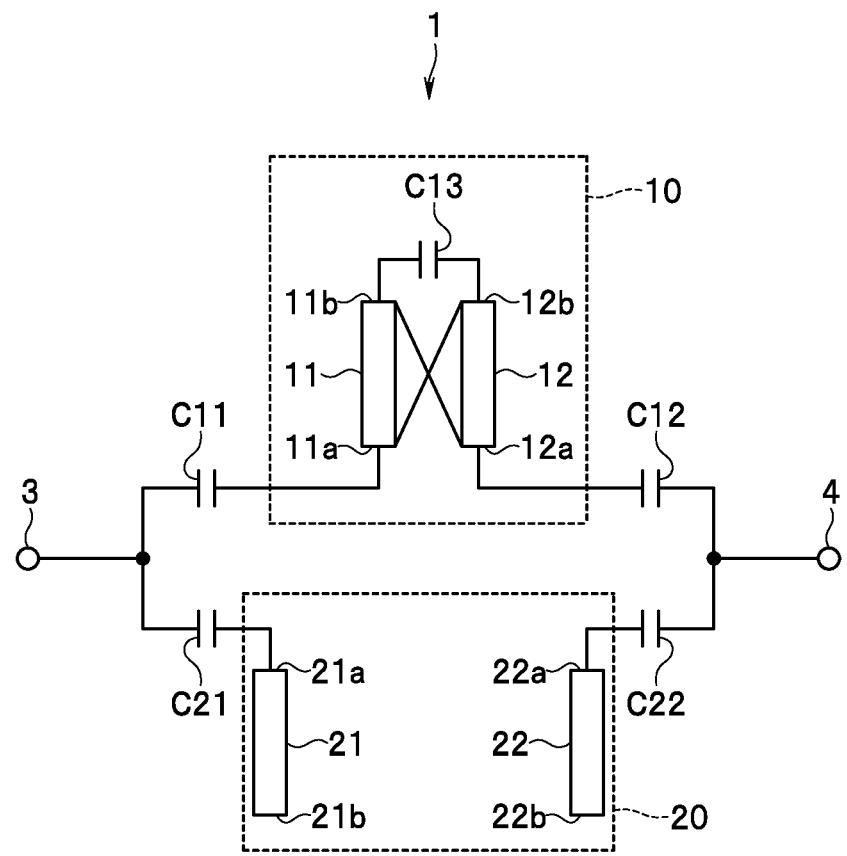
FIG. 25 is a circuit diagram illustrating a circuit configuration of a filter circuit according to a third embodiment of the present invention.

Reference is now made to FIG. 25 to describe a fourth embodiment of the present invention. FIG. 25 is a circuit diagram illustrating a circuit configuration of a filter circuit 1 according to the present embodiment.

The configuration of the filter circuit 1 according to the present embodiment is different from that of the first embodiment in terms of the following respects. In the present embodiment, the second resonators 21 and 22 of the second resonant circuit 20 are not magnetically coupled with each other. This configuration can be obtained, for example, by increasing the distance between the two resonator conductor layers constituting the second resonators 21 and 22.

Note that, in the present embodiment, one of the second resonators 21 and 22 need not necessarily be provided. For example, when only the second resonator 21 is provided, the second resonant circuit 20 is coupled only with the port 3. In contrast, when only the second resonator 22 is provided, the second resonant circuit 20 is coupled only with the port 4.

The configuration of the first resonant circuit 10 may be the same as that of the second embodiment. The first resonant circuit 10 may be directly coupled with each of the ports 3 and 4 as in the third embodiment. The other configuration, function, and effects of the present embodiment are similar to any of the first to third embodiments.

Note that the present invention is not limited to the foregoing embodiments, and various modifications may be made thereto. For example, the number and the configuration of each of the first and second resonators are not limited to those illustrated in the foregoing embodiments, and can be freely chosen as far as the requirements of the appended claims are met. Each of the number of first resonators and the number of second resonators may be three or more.

The first resonant circuit 10 is not limited to a band-pass filter and may be a circuit configuring another filter such as a low-pass filter or a high-pass filter.

Obviously, many modifications and variations of the present invention are possible in the light of the above teachings. Thus, it is to be understood that, within the scope of the appended claims and equivalents thereof, the present invention may be practiced in other embodiments than the foregoing most preferable embodiments.

What is claimed is:

1. A filter circuit comprising:
    two ports;
    a first resonant circuit including a plurality of first resonators, provided between the two ports in a circuit configuration, and coupled with both of the two ports;
    a second resonant circuit including a plurality of second resonators, provided between the two ports in the circuit configuration, and coupled with at least one of the two ports; and
    a stack including a plurality of dielectric layers stacked together, and a plurality of conductor layers and a plurality of through holes formed on the plurality of dielectric layers, the stack being for integrating the two ports, the first resonant circuit, and the second resonant circuit, wherein
    components of the first resonant circuit and components of the second resonant circuit are configured using the plurality of conductor layers, and
    coupling of the second resonant circuit and the two ports is weaker than coupling of the first resonant circuit and the two ports.

2. The filter circuit according to claim 1, further comprising:
    two first capacitors capacitive-coupling the first resonant circuit and the two ports; and
    at least one second capacitor capacitive-coupling the second resonant circuit and the two ports, wherein
    capacitance of the at least one second capacitor is smaller than capacitance of each of the two first capacitors.

3. The filter circuit according to claim 1, further comprising
at least one second capacitor capacitive-coupling the second resonant circuit and the two ports, wherein
the first resonant circuit is directly coupled with at least one of the two ports.

4. The filter circuit according to claim 1, wherein
the plurality of second resonators include a first particular resonator and a second particular resonator,
the first particular resonator is coupled with one of the two ports, and
the second particular resonator is coupled with the other of the two ports.

5. The filter circuit according to claim 4, wherein the first particular resonator and the second particular resonator are coupled with each other.

6. The filter circuit according to claim 1, wherein each of the plurality of second resonators is a resonator with open ends.

7. The filter circuit according to claim 1, wherein the first resonant circuit configures a band-pass filter.

8. The filter circuit according to claim 1, wherein the second resonant circuit configures a band elimination filter.

\* \* \* \* \*